United States Patent
Floro et al.

(10) Patent No.: US 6,760,672 B2
(45) Date of Patent: Jul. 6, 2004

(54) AUTOMATIC DETECTION OF BATTERY-BACKED DATA INTEGRITY IN VOLATILE MEMORY

(75) Inventors: William Edward Floro, Willoughby, OH (US); Frank Joseph Priore, Willoughby Hills, OH (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 88 days.

(21) Appl. No.: 10/058,625

(22) Filed: Jan. 29, 2002

(65) Prior Publication Data

US 2003/0144804 A1 Jul. 31, 2003

(51) Int. Cl.⁷ .............................................. G06F 19/00
(52) U.S. Cl. .............................. 702/63; 702/64; 702/65
(58) Field of Search .............................. 702/57, 60, 63, 702/64, 65, 116; 307/38–39, 64, 66; 323/210, 211; 320/132, 121, 123, 137, 140

(56) References Cited

U.S. PATENT DOCUMENTS

| | | | | |
|---|---|---|---|---|
| 5,706,239 A | * | 1/1998 | Brys | 365/226 |
| 5,783,964 A | * | 7/1998 | Eitan | 327/408 |
| 6,104,103 A | * | 8/2000 | Siewert et al. | 307/64 |

* cited by examiner

Primary Examiner—Bryan Bui
(74) Attorney, Agent, or Firm—Quarles & Brady; R. Scott Speroff

(57) ABSTRACT

Battery backed memory for use in an industrial controller allows volatile memory to be retained in instances of line power loss. A method and apparatus are disclosed for providing assurance that sufficient battery voltage was present during the entire power down period to maintain data integrity.

25 Claims, 2 Drawing Sheets

AUTOMATIC DETECTION OF BATTERY-BACKED DATA INTEGRITY IN VOLATILE MEMORY

CROSS-REFERENCE TO RELATED APPLICATIONS

STATEMENT REGARDING FEDERALLY SPONSORED RESEARCH OR DEVELOPMENT

BACKGROUND OF THE INVENTION

The present invention relates generally to industrial control systems, and in particular relates to an industrial control system having a battery backed volatile solid-state memory, the battery preventing loss of data during momentary power interruptions.

Industrial controllers are special purpose computers used for the control of industrial processes and the like. While executing a stored program, they read inputs from the controlled process and, according to the logic of a contained control program, provide outputs to the controlled process.

Industrial controllers differ from regular computers both in that they provide "real-time" control (i.e., control in which control outputs are produced predictably and rapidly in response to given control inputs) and in that they provide for extremely reliable operation. In this latter regard, the volatile memory used by the industrial controller is often backed up with a battery so that data needed for the control program is not lost during momentary power outages. Volatile memory is that which requires power to maintain its stored data.

Such "battery backed" memory, using a combination of static random access memory (SRAM) and a long life battery such as a lithium cell, is well known. In current control applications, synchronous dynamic random access memory (SDRAM) may be preferred to SRAM because of its higher density, faster speed, and lower cost. Unfortunately, the amount of power needed for SDRAM can be thirty or more times greater than that needed for conventional SRAM devices. The voltage requirements of SDRAM require that the lithium cell voltage be boosted with a DC-to-DC converter, introducing additional power losses of about 25 percent. High speed SRAM is one alternative, but high-speed SRAM still draws about ten times as much current as the older SRAM devices, and does not have the density or low cost of SDRAM.

Battery-backed volatile memory devices have been installed in control systems to reduce the likelihood that data integrity will be lost from volatile memory during instances of power loss. However, it should be appreciated that the battery voltage may decrease to a critical voltage level, at which point cells within the volatile memory may begin to be corrupted. As the backup voltage dips further below the critical level, additional memory is likely to be lost. If the backup voltage reaches the critical level (and below) as the result of cold temperatures or a temporary load on the battery, the low critical voltage may only be temporary. Accordingly, when the power loss is corrected, it is impossible to determine with certainty whether the volatile memory is valid simply by checking the battery voltage at the time.

One approach to this problem is to write a small sample of known data to a small number of cells to verify that these cells have maintained their integrity during the period of battery backup as an indication that the integrity of the entire memory has been maintained. This method, however, is not wholly reliable due to the large number of available cells, on the order of millions, and potentially small number cells that could become corrupted, especially when operating at or slightly below the critical voltage.

As an alternative, cyclic redundancy codes (CRC), or "parity bits" may be attached to memory data, and used to determine, for example, whether the data has been corrupted after periods of battery backup. Unfortunately, memory devices that contain extra bits for parity are becoming more difficult to obtain commercially, and in some cases are becoming obsolete altogether.

What is therefore needed is a more reliable and cost-effective method and apparatus for determining whether a battery-backed volatile memory has been corrupted in a control system that has experienced a power loss.

BRIEF SUMMARY OF THE INVENTION

The present invention provides automatic determination of whether the battery backup voltage level has been sufficient to ensure data integrity in volatile memory during an entire period of line power loss. By checking the history of this voltage level, a microprocessor may determine upon restoration of power whether data stored in volatile memory has been corrupted.

Specifically, the present invention provides a battery backed memory system having a first line receiving a source of line voltage. A volatile solid state memory reliably stores data when operated above a critical voltage level. A second line receiving a source of battery voltage provides backup voltage to the volatile memory during a loss of line voltage. A voltage sensor provides a signal indicating whether the backup voltage is at or below the critical voltage level. A microprocessor communicating with the volatile solid state memory and the voltage sensor, executes a program to determine, based on the signal from the voltage sensor, whether the backup voltage was at or below the critical voltage level at any time during the loss of line voltage.

Thus it is an object of the invention to enable the automatic detection of a reduction in power that jeopardizes data integrity in volatile memory without the need for parity memory devices or complex memory testing schemes.

The system may further include nonvolatile memory communicating with the microprocessor, such that the executed program may be held in the nonvolatile memory.

Thus it is another object of the invention to allow storage of a program in nonvolatile memory that enables the microprocessor determine whether data integrity was maintained in a volatile memory.

The voltage sensor may include a supervisory circuit that compares voltage from the second line to an internal reference to indicate whether the measured voltage is at or below the critical voltage level.

Thus it is another object of the invention to use a simple commercially available device to measure voltage on the volatile memory and produce a corresponding signal.

The voltage sensor may include a latch that receives the signal from the supervisory circuit.

Thus it is another object of the invention to store a signal indicating loss of battery power even after power from the line or from the battery has recovered.

The memory system may include a switch that is controlled by the latch output to provide a high impedance path to the microprocessor.

Thus it is another object of the invention to provide an input to the microprocessor that does not promote excess current flow when the microprocessor is unpowered.

The foregoing objects and advantages may not apply to all embodiments of the inventions and are not intended to define the scope of the invention, for which purpose claims are provided. In the following description, reference is made to the accompanying drawings, which form a part hereof, and in which there is shown by way of illustration, a preferred embodiment of the invention. Such embodiment also does not define the scope of the invention and reference must be made therefore to the claims for this purpose.

DETAILED DESCRIPTION OF THE PREFERRED EMBODIMENT

Figure 1:
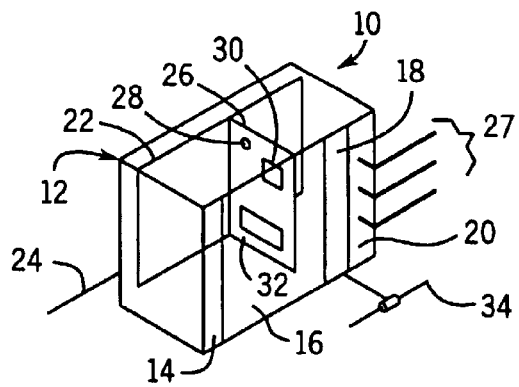
FIG. 1 is a simplified perspective view in phantom showing a processor board within an industrial controller, the former which may include a battery backing up a volatile memory.

Referring now to FIG. 1, an industrial controller 10 may include a chassis 12 incorporating a number of modules 14, 16, 18, and 20 interconnected by means of backplane 22.

In particular, a power supply module 14 provides power from a line source 24 and regulates the power for distribution along the backplane 22 to the other modules 16, 18, and 20. A processor module 16 receives data along the backplane 22 from a network module 18 or an I/O module 20. The network module 18 provides an interface with a communication network 34 such as EtherNet, or ControlNet to receive system control data or data from other I/O modules. The I/O module 20 provides an interface for input and output signals along I/O lines 27 communicating with the controlled process or machine. Generally, during operation of the industrial controller 10, a program executed by the processor module 16 reads this input data to create output data that is then returned along the backplane 22 from a network module 18 or an I/O module 20. The processor module 16 includes an internal processor circuit board 26 containing a battery 28, volatile memory 30, and processor circuitry 32.

Figure 2:
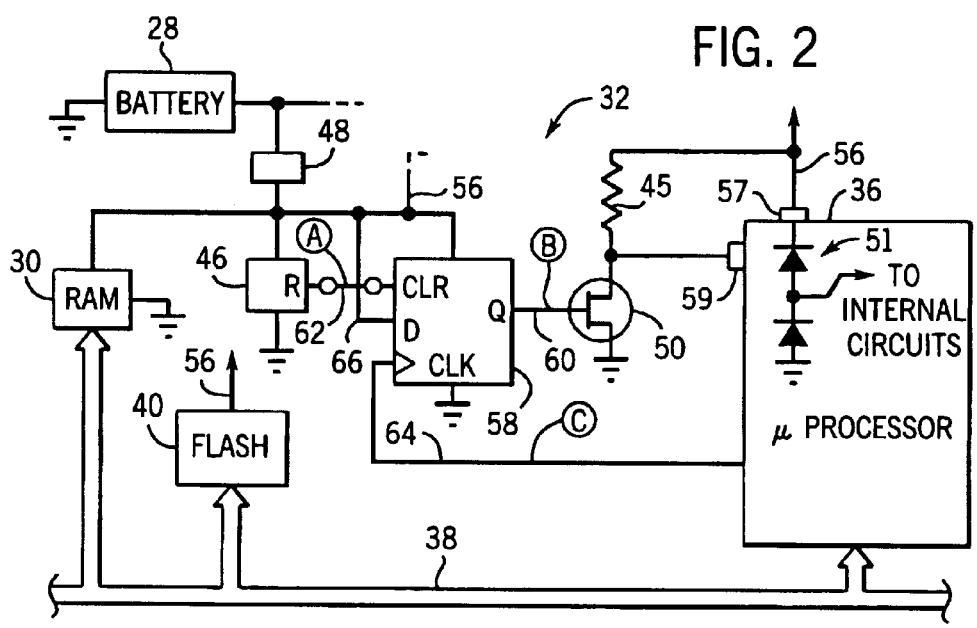
FIG. 2 is a schematic representation of the present invention showing a microprocessor having a battery-backed volatile memory and an associated supervisory circuit and latch to determine whether the battery voltage has fallen below a critical level during a power loss.

Referring now to FIG. 2, the battery may typically be a lithium battery as is generally known in the art. Such batteries are not rechargeable and hence must be replaced when their power is exhausted. The volatile memory 30 may include static random access memory (RAM) and/or synchronous dynamic random access memory (SDRAM) (collectively illustrated as RAM 30), both of which require application of power to maintain their memory states. The processor circuitry 32 includes a microprocessor 36 communicating via an internal data and address bus 38 with the volatile memory 30 and nonvolatile memory 40 which together contain control data and the control program. The non-volatile memory may be so called "flash" memory well known in the art. Microprocessor 36 receives power from a line power source 56.

According to methods well known in the art, the microprocessor 36 reads or writes to the volatile memory 30 or non-volatile memory 40 as is necessary to execute the control program. The microprocessor 36 may also communicate over bus 38, or via a similar mechanism, with the backplane 22 and hence with I/O modules 20 or network module 18.

Referring still to FIG. 2, power for the RAM 30 is received from a voltage regulator or DC-to-DC converter 48 of conventional design, connected to battery 28. The regulator or DC-to-DC converter is adjusted to the necessary battery backup voltage for the RAM 30. Generally voltage regulators operate to controllably reduce voltage, while DC-to-DC converters operate to controllably increase voltage.

The non-volatile memory 40 is connected to line power 56, as it does not require battery back up because it does not lose data when power is lost.

The processor circuitry 32 further includes a supervisory circuit 46 and latch 58 that also draw power from converter/regulator 48. The RAM 30, supervisory circuit 46, and latch 58 also have direct connections to line power 56 obtained from the power supply module 14 through the backplane 22.

Thus, when line power 56 is available, no current need be or is drawn from the battery 28, thereby saving its capacity instead for periods of unexpected interruption of line power 56. When an outage of line power 56 occurs, RAM 30, circuit 46, and latch 58 run on power provided from backup battery 28. It is appreciated that RAM 30 will maintain the integrity of its data only so long as the backup voltage from battery 28 is maintained above a critical level during a power outage. The critical level, of course, is specific to the volatile memory 30 that is used in the control system and may be further dependent on the operating mode of the RAM 30.

The supervisory circuit 46 measures the voltage supplied to RAM 30, and applies an output along line 62 (waveform "A" in FIG. 3) as a reset signal to a CLR input of latch 58. The latch 58 further receives a clock signal along line 64 (waveform "C" in FIG. 3) from microprocessor 36 at latch input CLK that is set high when the microprocessor is operating and has successfully been initialized, as will be described in more detail below. Latch 58 further receives a third input along line D that is hard-wired to be set high at all times. Thus generally, control of the latch 58 is provided by the reset signal 62 and clock signal 64. As will be described in more detail below, the latch 58 serves to retain information about loss of voltage from the supervisory circuit 46 even after voltage has been restored.

The output of latch 58 is applied along line 60 (waveform "B" in FIG. 3) to a transistor 50 that acts as a switch to control the state of a microprocessor input 59. Specifically, the transistor 50 operates in conjunction with pull-up resistor 45 (attached to line power source 56) to both invert the signal along line 60 and also to provide a high impedance path between the latch 58 and the microprocessor input 59 to prevent current flow from the output of the latch 58 if it is powered and if its output is high when the microprocessor 36 is unpowered. If the latch 58 output was connected directly to the microprocessor input 59 without the isolation of transistor 50 and resistor 45, current could flow from the latch 58 into the microprocessor 36 and through the upper protection diode 51 to line power 56, which would be either at or near zero volts since the microprocessor 36 is unpowered.

The protection diodes are present in most all digital devices and are well known in the art to protect inputs by conducting current to the device power supply if the input voltage exceeds the service power voltage by more than a forward biased voltage drop, typically around 0.7 volts.

The construction of transistor 50 is well known in the art and allows its gate voltage to be driven to a logical high state by latch 58 with limited current draw, typically less than 1 microamp. If the latch output 60 was connected to microprocessor, excessive current could flow which could damage the microprocessor or consume undue power during periods of battery backup. In the example illustrated, the transistor 50 may be an n-channel field effect transistor that allows the voltage level at input 59 to be high when the output signal 60 is low. Conversely, the voltage level at input 59 is low when the output signal 60 is high. Thus, a high or set state of the output of the latch 58 will switch the transistor 50 on, causing microprocessor 36 to read a low input 59, whereas a low or reset state of the output of the latch 58 will switch the transistor off, thereby producing a high signal at input 59. It will be understood that the particular voltage considered to be the "set" state is arbitrary and for the purposes of the claims herein, the terms "set" and "reset" should be construed to embrace either high or low voltages according to the necessary logic to be effected by the present invention.

As will be described in more detail below, the microprocessor 36 reads input 59 when power is restored to determine whether the data stored in volatile memory 30 was corrupted during the power failure. In particular, a high input 59 indicates that data in the volatile memory 30 has been corrupted during the previous power outage, while a low input 59 verifies that the backup voltage did not, at any time during the power outage, drop to a level at or below the critical level, and data integrity is thus not compromised due to excessively low backup voltage. It will be appreciated in this regard that supervisory circuit 46 and latch 58, in combination, provide a voltage sensor that provides a signal indicating whether the voltage source to volatile memory 30 has fallen below the critical level needed to maintain data integrity during the power outage.

In particular, if the backup voltage to RAM 30 remains above the critical level during a power outage, latch input CLR will remain high, and latch output 60 will remain high and is applied to transistor 50 over line 60. (Note that CLK is low when the microprocessor 36 is off during a power outage). The transistor 50 thus pulls the voltage at input 59 to ground when power is restored. In this way, input 59 will be seen low when examined by the microprocessor 36.

If, however, at any time during the power outage, the backup voltage reaches the critical level (or below), the supervisory circuit 46 will clear the latch 58. The latch output 60 will then be set low and applied to transistor 50. Transistor 50 will then allow input 59 to be pulled up by resistor 45. Accordingly, microprocessor will read a high input 59 upon subsequent initialization. It should be appreciated that once input 59 is high, it will remain high regardless of whether the backup voltage returns to a level greater than the critical state during the power outage. The latch will not be reset until power is restored and the microprocessor 36 sets the clock to a high state, as will be described below.

Figure 3:
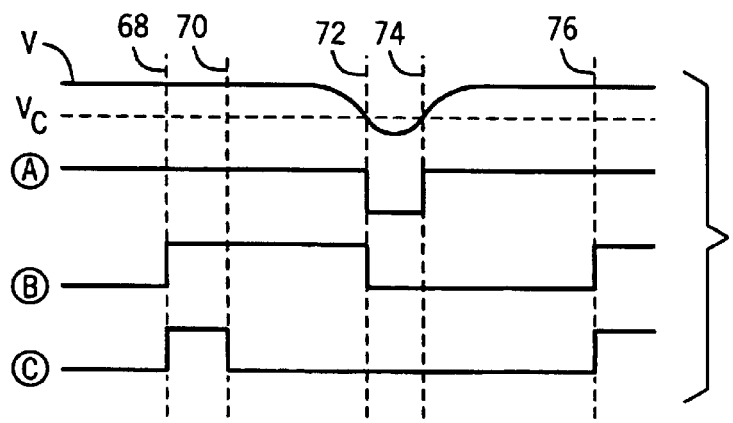
FIG. 3 is a timing diagram showing the signals at specific locations on the schematic of FIG. 2 during initial application of power to the industrial controller, an unanticipated power loss, a moment where backup voltage levels have decreased below a critical level, and subsequent power-up.

Referring now also to FIG. 3, upon application of line power 56 (for example, when the system is turned on for the first time) power to the volatile memory 30 will rise to a predetermined normal voltage (V) necessary for supplying power to the control system. The supervisory circuit 46 continuously compares the voltage V to $V_c$ (the critical voltage). This comparison is done even during normal operating conditions to determine whether the power supply is sufficient to ensure data integrity in volatile memory 30. If V is greater than $V_c$, as it will be when using line power 56, a high value will be applied to latch input CLR from the supervisory circuit 46 along line 62 which has no effect on the output state 60 of latch 58.

During the normal initialization routines executed by the microprocessor 36 out of nonvolatile memory 40, the volatile memory 30 will be initialized with necessary programs and data for operation. When this is complete, as indicated by a vertical dotted line 68, the microprocessor 36 strobes the CLK input to the latch 58 (signal C) to set the latch 58 which will then provide a high output along line 60 to transistor 50.

At some later time 70, a power loss may occur. At this time, the microprocessor 36 is shut down and the clock signal 64 at latch input CLK goes to zero. The RAM 30, supervisory circuit 46, and latch 58 continue operating under power from backup battery 28. Because, at least initially, the backup voltage from battery 28 will be above the critical level $V_c$ required to maintain data integrity in memory 30, the high value along line 62 from the supervisory circuit 46 to latch input CLR is maintained.

If the period of battery backup is long, or if the battery 28 is weak or cold, the voltage V may eventually drop below the critical level $V_c$. In this case, the supervisory circuit 46 senses that the backup voltage of battery 28 is below the critical level at time 72, the reset signal 62 is set low and applied to latch input CLR. Accordingly, the latch output along line 60 is set low and applied to transistor 50, thereby resulting in a high input 59 that will be detected by microprocessor 36 when line power is restored. It should be appreciated that $V_c$ may be selected slightly higher than the actual critical voltage of the volatile memory 30 to provide further assurance that the control system will not rely on corrupted data after a power loss.

One might expect the backup voltage from the battery 28 to continue to fall until power is restored. If this was the case, then a mere examination of the battery voltage at the time of power restoration would provide a reliable indication of whether data in volatile memory 30 was corrupted during the power outage. However, during the power outage, momentary loads on the battery 28, "quick" battery replacement while capacitors on the battery line temporarily power the memory, or cold temperature could cause the voltage to drop below the critical level for a brief period of time (e.g. between times 72 and 74), thereby causing data corruption. Even if the voltage returns to a "safe" level before power is subsequently restored, the data will remain corrupt. The corrupt data would thus go undetected if an examination of the battery voltage at the time of power restoration were relied upon.

The present invention provides a voltage sensor that produces a signal indicating whether the data stored in a battery-backed volatile memory was corrupted (or likely to be corrupted) during a power outage. Advantageously, the signal is detectable even if the backup voltage subsequently returns to a safe level prior to power restoration. For example, at time 74, when the backup power has increased to a value greater than the critical voltage, the supervisory circuit 46 sends a high output along line 62 to the latch input CLR. However, a high level on the clear input of the latch will not change the low output on line 60, and microprocessor input 59 therefore remains high. When power to microprocessor 36 is restored, the high input 59 is sensed, and the microprocessor 36 determines that data in memory 30 has been corrupted even though the backup voltage was only temporarily below the critical level.

If once line power 56 to microprocessor 36 is restored at time 76, the data of the volatile memory 30 is restored, the microprocessor 36 may again set the clock signal high along line 64. The latch, in response to the high CLK input, coupled with the high CLR input, applies a high output to transistor 50 along line 60. Microprocessor input 59 is therefore returned to a low state until the next instance that the backup voltage fails to maintain data integrity in volatile memory 30 during a power outage.

It should be appreciated that the amount of voltage necessary to run supervisory circuit 46 and latch 58 is normally less than the critical voltage needed to maintain memory integrity in RAM 30. In some instances, however, the backup voltage may be insufficient to operate the circuit 46 and latch 58. When battery power to circuit 46 has fallen below the minimum level necessary to support its operation and subsequently rises, output 62 will be held in a low state for approximately 200 ms before going high. Accordingly, if the latch 58 "awakens" subsequent to the supervisory circuit 46, a low signal will be applied along line 62 to latch input CLR, which will produce a high input 59 as described above. Alternatively, latch 58 and supervisory circuit 46 could be provided with a dedicated backup power source.

Figure 4:
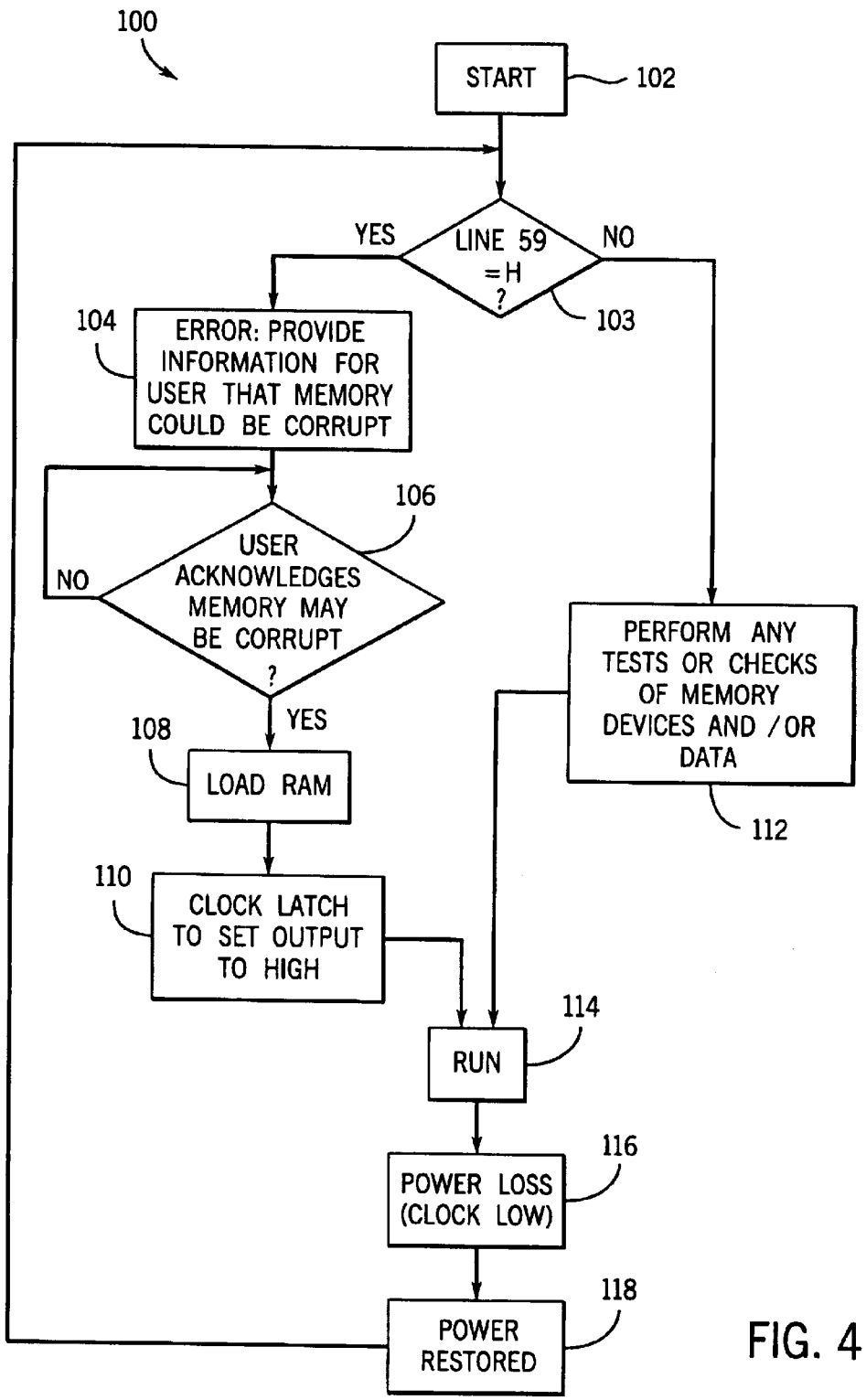
FIG. 4 is a flow chart showing the steps performed by the microprocessor upon start-up in accordance with the preferred embodiment.

Referring now to FIG. 4, during a normal startup, as may be distinguished from a power loss by, for example, a transition of a front panel switch on the power supply 14 of FIG. 1, power is first applied to the microprocessor 36 and a microprocessor routine 100 is executed from the nonvolatile FLASH memory 40, and begins at step 102. At decision block 103, the microprocessor will first test line 59 to see if memory voltage has remained valid during all of the power down period.

If the voltage dipped low as seen by line 59 high, then routine 100 advances to step 104, whereby an action will be taken so that the user will know that the memory data may be corrupt. For example, the data could be made inaccessible, an indicator could be illuminated on the front of the processor, and/or a "memory fault" bit in a status register could be set that is accessible to the user through a network module 18 or I/O module 20 to indicate that the contents of memory 30 cannot be trusted. Routine 100 requires some interaction by the user at step 106 such as a power up communication via a communications port, or the like, to inform the microprocessor 36 how to proceed, typically to reload the RAM 30 with data that will enable the microprocessor 36 to continue executing the control function. In particular, the routine 100 advances to step 108 which causes the microprocessor 36 to load data from the Flash device 40 to the RAM 30 for use in normal operations. After loading the RAM, microprocessor 36 will pulse line 64 at step 110 to clock the latch 58 and set its output to high in preparation for the next power down. The microprocesor may then begin/resume normal operation at step 114.

If line 59 is low at decision block 103, then the microprocessor 36 can test the memory devices and/or perform any other desired verifications of data at step 112, such as comparing some RAM data values with known values stored in the Flash. If tests show no reason to believe that the data or devices cannot be trusted, then the microprocessor 36 may begin normal operation at step 114.

If the processor circuitry 32 experiences a disruption in line power 56, indicated at 116, the program ceases execution as power to the microprocessor 36 is lost. At this time the clock signal drops to low but latch output 60 remains high unless the backup voltage decreases below the critical level.

Microprocessor 36 remains off until power is restored at step 118, at which point it will recognize that power has been lost and examine input 59 at decision block 103 to determine whether the backup voltage dropped to a level at or below the critical level at any time during the power outage.

If, at decision block 103, it is determined that input 59 is high, then the microprocessor 36 concludes that the backup voltage fell below the pre-selected critical level. Because data integrity in volatile memory 30 can not be ensured, an error condition is generated at step 104, as described above. If, on the other hand, it is determined at decision block 103 that input 59 is low, the microprocessor 36 will conclude that power to the volatile memory 30 had been maintained at all times during the power outage, and the program continues to step 112 to perform any other device or memory tests before proceeding to operate with the memory data in block 108, as described above.

The above description has been that of a preferred embodiment of the present invention, it will occur to those that practice the art that many modifications may be made without departing from the spirit and scope of the invention. For example, a skilled artisan will appreciate that several alternatives to transistor 50 are available. In this regard, the microprocessor may communicate with the voltage sensor either indirectly (e.g. via transistor or like device) or directly, and the present invention is intended to cover both possibilities. In order to apprise the public of the various embodiments that may fall within the scope of the invention, the following claims are made.

We claim:

1. A battery backed memory system comprising:
    a first line receiving a source of line voltage;
    volatile solid state memory storing data while receiving a voltage above a critical voltage level;
    a second line receiving a source of battery voltage and providing the battery voltage to the volatile memory during a loss of line voltage;
    a voltage sensor measuring the backup voltage relative to the critical voltage level and providing a signal, wherein the voltage sensor includes a supervisory circuit that measures voltage from the second line and outputs a signal comparing the measured voltage and an internal reference providing the critical voltage level; and
    a microprocessor communicating with the volatile solid state memory and the voltage sensor and executing a program to determine whether the backup voltage was at or below the critical voltage level at any time during the loss of line voltage.

2. The battery backed memory system as recited in claim 1, further comprising nonvolatile solid state memory communicating with the microprocessor, wherein the program is read by the microprocessor from the nonvolatile memory.

3. The battery backed memory system as recited in claim 1, wherein the voltage sensor further includes a latch set by the signal from the supervisory circuit.

4. The battery backed memory system as recited in claim 3 wherein the latch further communicates with the microprocessor to receive a signal indicating data in the volatile memory has been restored and resetting the latch.

5. The battery backed memory system as recited in claim 4, further comprising a switch that is controlled by the latch output and that, in turn, provides an input to the microprocessor while maintaining a high impedance between the latch and microprocessor.

6. The battery backed memory system as recited in claim 5, wherein the latch receives power from the second line.

7. The battery backed memory system as recited in claim 5, wherein the supervisory circuit receives power from the second line.

8. The battery backed memory system of claim 1 wherein the volatile memory includes memory selected from the group consisting of static and dynamic random access memory.

9. The battery backed memory system of claim 8 further including a DC/DC converter and wherein the volatile memory receives voltage from the second line via the DC/DC converter.

10. The battery backed memory system of claim 8 further including a voltage regulator circuit and wherein the volatile memory receives voltage from the second line via the voltage regulator circuit.

11. A method of controlling a battery backed memory system including a first line receiving a source of line voltage, volatile solid state memory storing data while receiving a voltage above a critical voltage level, a second line receiving a source of battery voltage to provide backup voltage to the volatile memory during a loss of line voltage, providing a signal measuring the backup voltage relative to the critical voltage level, and a microprocessor communicating with the volatile solid state memory and the voltage sensor, the method comprising the step steps of:

measuring the voltage to the volatile memory;

outputting a signal comparing the measured voltage and an internal reference providing the critical voltage level; and executing a program on the microprocessor that determines, based on the signal from the voltage sensor, whether the backup voltage was above the critical voltage level during the entire loss of line voltage.

12. The method as recited in claim 11, wherein the voltage sensor further includes a latch, the method further comprising the step of latching the output signal to provide a latch output indicating whether the backup voltage fell below the critical voltage.

13. The method of claim 12, wherein the battery-backed memory system further includes a switch that receives the latch output and communicates with a microprocessor input to provide a high impedance path there between.

14. The method as recited in claim 13, further comprising the step of resetting the latch after the determination by the microprocessor whether the backup voltage was above the critical voltage level during the entire loss of line voltage.

15. A method of verifying a status of battery-backed volatile memory that requires a critical voltage level to maintain integrity of data stored therein, the steps comprising:

(A) providing voltage from a primary source to the volatile memory at a level greater than the critical voltage level;

(B) providing the volatile memory with backup voltage from a backup source during an interruption of the primary source;

(C) measuring the backup voltage during the interruption; and (D) outputting a signal indicating that whether the backup voltage was above the critical voltage level during the entire interruption;

(E) restoring the voltage from the primary source to the volatile memory; and (F) executing a program at a microprocessor to determine, based on the signal, whether data integrity was maintained in the volatile memory during the interruption.

16. The method as recited in claim 15, further comprising loading the data from volatile memory to execute a control function at the microprocessor if data integrity was maintained.

17. The method as recited in claim 15, further comprising determining that an error condition exists if the backup voltage was not maintained above the critical voltage level during the interruption.

18. A battery backed memory system comprising:

a first line receiving a source of line voltage;

volatile memory storing data while receiving a voltage above a critical voltage level;

a second line receiving a source of battery voltage and providing the battery voltage to the volatile memory during a loss of line voltage;

a voltage sensor measuring the backup voltage relative to the critical voltage level and providing a signal;

a latch receiving the signal and operable to provide an output when the backup voltage falls below the critical voltage level, wherein the output is maintained after the backup voltage rises above the critical voltage level;

a microprocessor executing a program to determine, based on the output, whether the backup voltage was at or below the critical voltage level at any time during the loss of line voltage.

19. The battery backed memory system as recited in claim 18, wherein the voltage sensor includes a supervisory circuit that measures voltage from the second line and outputs a signal comparing the measured voltage and an internal reference providing the critical voltage level.

20. The battery backed memory system as recited in claim 18 wherein the latch further communicates with the microprocessor to receive a signal indicating data in the volatile memory has been restored and resetting the latch.

21. A battery backed memory system comprising:

a first line receiving a source of line voltage;

volatile solid state memory storing data while receiving a voltage above a critical voltage level;

a second line receiving a source of battery voltage and providing the battery voltage to the volatile memory during a loss of line voltage;

a voltage sensor measuring the backup voltage relative to the critical voltage level; and a microprocessor communicating with the volatile solid state memory and the voltage sensor and executing a program to determine whether the backup voltage was at or below the critical voltage level at any time during the loss of line voltage after the backup voltage has returned to a level above the critical voltage level.

22. The battery backed memory system as recited in claim 21, wherein the voltage sensor includes a supervisory circuit that measures voltage from the second line and outputs a signal comparing the measured voltage and an internal reference providing the critical voltage level.

23. The battery backed memory system as recited in claim 22, wherein the voltage sensor further includes a latch set by the signal from the supervisory circuit.

24. The battery backed memory system as recited in claim 23, wherein the latch provides an output when the backup voltage falls below the critical voltage level, and wherein the latch output is maintained after the backup voltage rises above the critical voltage level.

25. The battery backed memory system as recited in claim 24, wherein the latch further communicates with the microprocessor to receive a signal indicating data in the volatile memory has been restored and resetting the latch.

* * * * *